Jan. 10, 1956  G. G. HUNTER  2,730,356
LOAD SUPPORTING AND VIBRATION DAMPING MOUNTING
Filed March 2, 1953
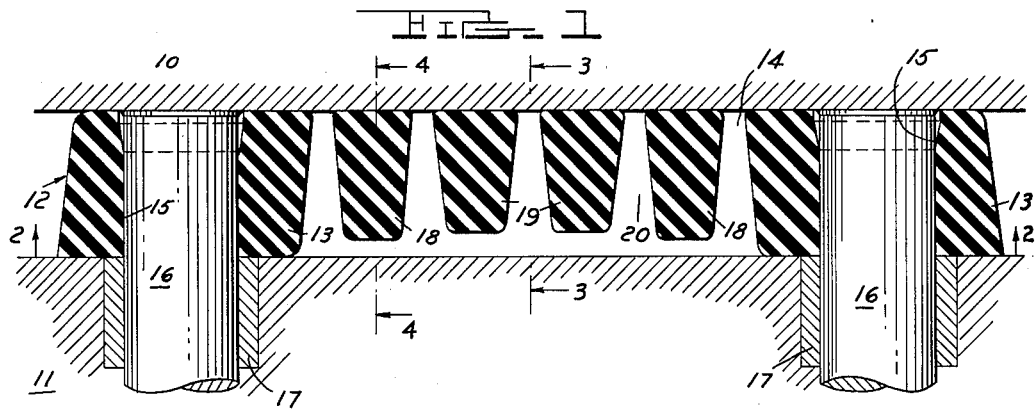
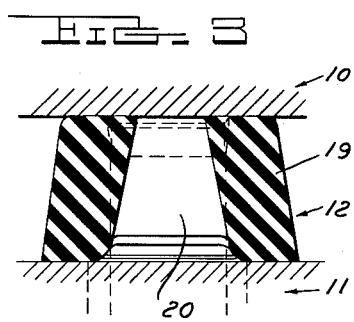
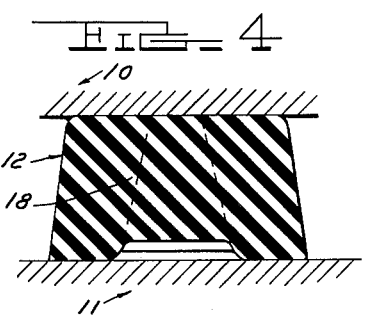
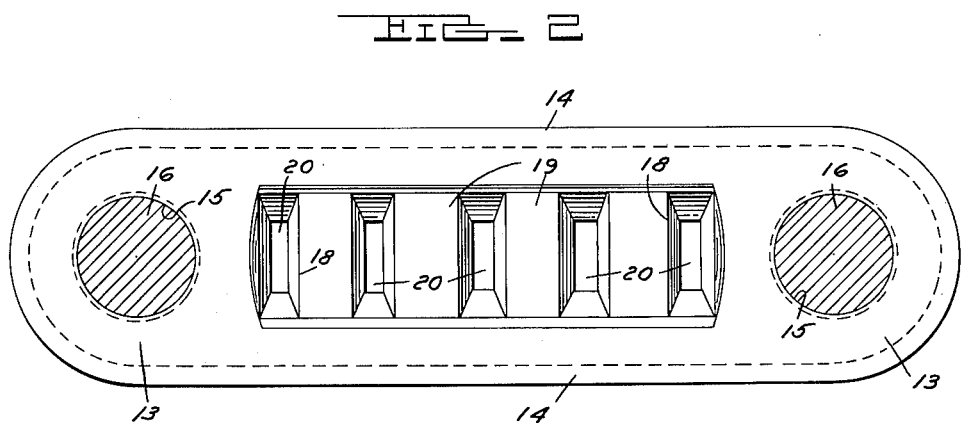
INVENTOR.
GERALD G. HUNTER
BY
Whittemore, Hulbert & Belknap
ATTORNEYS

United States Patent Office 2,730,356
Patented Jan. 10, 1956

2,730,356

LOAD SUPPORTING AND VIBRATION DAMPING MOUNTING

Gerald G. Hunter, Pontiac, Mich., assignor to Baldwin Rubber Company, Pontiac, Mich., a corporation of Michigan Application March 2, 1953, Serial No. 339,633

4 Claims. (Cl. 267—63)

This invention relates to an improved load supporting and vibration damping mounting.

More particularly, the invention provides a resilient mounting in the form of a block of rubber or some material having characteristics similar to rubber and capable of use in road vehicles for supporting the sprung-weight on the unsprung assembly. In accordance with this invention, the resilient block is constructed in a manner to provide the wide range of deflection required to assure optimum riding qualities regardless of load.

One common fault with conventional vehicle suspension systems is that such systems are incapable of altering deflection in relationship to the load. In other words, if the suspension system is designed to afford optimum riding characteristics at full load, it falls far short of supplying satisfactory riding qualities under light or no load conditions. Conversely if the suspension is designed to provide optimum riding characteristics under light or no load conditions then it fails to afford a satisfactory ride under full load. The above problem is particularly critical in commercial vehicles where the load varies over an exceptionally wide range from no load to the maximum rated load.

The present invention provides a simple, inexpensive mounting which greatly improves the riding characteristics regardless of load and this is accomplished with a resilient load supporting block having a plurality of load supporting portions which successively become operative as the load on the sprung weight increases. Thus, by properly designing the load supporting portions of the resilient block it is possible to obtain more satisfactory riding characteristics under a wide range of load conditions.

The foregoing as well as other objects will be made more apparent as this description proceeds especially when considered in connection with the accompanying drawing wherein:

Figure 1 is a fragmentary longitudinal sectional view showing a resilient mounting embodying the features of this invention;

Figure 2 is a sectional view taken on the line 2—2 of Figure 1;

Figures 3 and 4 are cross sectional views taken respectively on the lines 3—3 and 4—4 of Figure 1.

In the embodiment of the invention selected herein for the purpose of illustration, the numeral 10 designates the sprung assembly of a vehicle and the numeral 11 indicates the unsprung assembly of the vehicle. The sprung assembly 10 is supported on the unsprung assembly 11 by an elongated resilient block 12 interposed between said assemblies and formed of rubber or some material having characteristics similar to rubber. In most applications it is preferred to mold the block 12 from a synthetic rubber compound capable of withstanding exceptionally heavy loads for indefinite periods without losing its resiliency and also capable of withstanding oil and grease without deteriorating.

The resilient block 12 is also designed to provide a progressively increasing resistance to relative movement of the assemblies toward one another by either the load applied to the sprung assembly 10 or by road shocks imparted to the unsprung assembly 11 or by both said causes, and is capable of performing the above result without the assistance of the usual semi-elliptical leaf springs or other similar suspension means.

In detail, the block 12 has pads 13 at opposite ends integrally connected by opposite side walls 14 and having openings 15 therethrough for respectively slidably receiving a pair of vertical guide pins 16. The upper ends of the pin 16 are secured to the underside of the sprung assembly 10 and the lower ends of the pins 16 are respectively slidably received by a pair of bushings 17 secured in bores formed in the unsprung assembly 11.

The height of the pads 13 and walls 14 correspond to the over-all thickness of the block 12 and hence serve to support the weight of the sprung assembly 10 as well as a relatively light load on the sprung assembly 10. Integrally connecting the opposite side walls 14 of the block 12 between the pads 13 are two pairs of ribs 18 and 19 extending transversely of the block 12 in spaced relation to each other and to the pads 13. The spaces 20 resulting from the above structure form air chamber and compression of the air trapped in said chambers assists in resisting relative movement of the assemblies toward one another.

As shown in Figure 1, the ribs of the pair 18 are respectively located adjacent the pads 13 and have a height somewhat less than the pads 13. The ribs of the pair 19 are located between the ribs of the pair 18 and have a height somewhat less than the ribs of the pair 18. Thus, the structure of the block 12 is such that when the vehicle is operated with a light or no pay load, the ribs are not subjected to compressive forces of any consequence. In other words, the sprung assembly 10 is carried by the pads 13 together with the side wall portions 14, and sufficient resiliency is afforded by the block 12 to provide optimum riding characteristics when the vehicle is operating with little or no pay load.

Should the pay load on the sprung assembly 10 be increased substantially, or should road shocks of considerable magnitude be imparted to the unsprung assembly 11, the pairs of ribs will successively become operative to increase the resistance to relative movement of the assemblies toward one another. Thus, the resistance afforded by the block 12 to relative movement of the assemblies toward one another is progressively increased as the pay load on the sprung assembly 10 is increased or as the road shocks imparted to the unsprung assembly 11 become more severe.

What I claim as my invention is:

1. In combination with vertically spaced members supported for relative movement in directions toward and away from each other and laterally spaced guide pins extending between said members to prevent lateral shifting movement of the members, a mounting interposed between said members including an elongated block of resilient material having load supporting pads at opposite ends formed with vertical passages respectively receiving said pins and being of a height corresponding to the thickness of the block to support one member on the other, said block having spaced side walls having a height corresponding to the height of said pads and integrally connecting said pads and cooperating therewith to support one member on the other, said block also having a plurality of ribs between said pads extending transversely of said block and integrally connecting the opposite side walls, said ribs being independent of each other and being separated from said pads and from each other by openings extending through said block from the top to the bottom thereof, the ribs having a height approximating but slightly less than the thickness of the pads and coacting with the pads to support the load in response to a deflection of the pads a distance greater than the height differential between the ribs and pads.

2. In combination with vertically spaced members supported for relative movement in directions toward and away from each other and laterally spaced guide pins extending between said members to prevent lateral shifting movement of the members, a mounting interposed between said members including an elongated block of resilient material having load supporting pads at opposite ends formed with vertical passages respectively receiving said pins and being of a height corresponding to the thickness of the block to support one member on the other, said block having spaced side walls having a height corresponding to the height of said pads and integrally connecting said pads and cooperating therewith to support one member on the other, said block also having a plurality of ribs between said pads extending transversely of said block and integrally connecting the opposite side walls, said ribs being independent of each other and being separated from said pads and from each other by openings extending through said block from the top to the bottom thereof, the tops of said pads, ribs and side walls lying in a common plane and the bottoms of said pads and side walls lying in a common plane spaced slightly below the bottoms of said ribs, whereby said ribs coact with said pads to support the load in response to a deflection of the pads a distance greater than the height differential between the ribs and pads.

3. In combination with vertically spaced members supported for relative movement in directions toward and away from each other and laterally spaced guide pins extending between said members to prevent lateral shifting movement of the members, a mounting interposed between said members including an elongated block of resilient material having load supporting pads at opposite ends formed with vertical passages respectively receiving said pins and being of a height corresponding to the thickness of the block to support one member on the other, said block having spaced side walls having a height corresponding to the height of said pads and integrally connecting said pads and cooperating therewith to support one member on the other, said block also having a plurality of ribs between said pads extending transversely of said block and integrally connecting the opposite side walls, said ribs being independent of each other and being separated from said pads and from each other by openings extending through said block from the top to the bottom thereof, the tops of said pads, ribs and side walls lying in a common plane and the bottoms of said pads and side walls lying in a common plane spaced slightly below the bottoms of said ribs, whereby said ribs coact with said pads to support the load in response to a deflection of the pads a distance greater than the height differential between the ribs and pads, said ribs being of gradually increasing height from the central portion of the block toward the pads and each rib having end walls which taper toward one another from the top to the bottom thereof.

4. In combination with vertically spaced members supported for relative movement in directions toward and away from each other and laterally spaced guide pins extending between said members to prevent lateral shifting movement of the members, a mounting interposed between said members including an elongated block of resilient material having load supporting pads at opposite ends formed with vertical passages respectively receiving said pins and being of a height corresponding to the thickness of the block to support one member on the other, said block having spaced side walls integrally connecting said pads, said block also having a plurality of ribs between said pads extending transversely of said block and integrally connecting the opposite side walls, said ribs being independent of each other and being separated from said pads and from each other by openings extending through said block from the top to the bottom thereof, the ribs having a height approximating but slightly less than the thickness of the pads and coacting with the pads to support the load in response to a deflection of the pads a distance greater than the height differential between the ribs and pads.

References Cited in the file of this patent

UNITED STATES PATENTS

| | | |
|---|---|---|
| 1,538,737 | O'Flynn | May 19, 1927 |
| 2,100,065 | Buckwalter | Nov. 23, 1937 |
| 2,546,394 | Harmon | Mar. 27, 1951 |

FOREIGN PATENTS

| | | |
|---|---|---|
| 10,615 | Great Britain | 1889 |